United States Patent [19]

Park

[11] Patent Number: 5,717,258
[45] Date of Patent: Feb. 10, 1998

[54] SWITCHING SYSTEM

[75] Inventor: Hyung Sik Park, Kwangju, Rep. of Korea

[73] Assignee: Medison Co., Ltd., Kangwon-do, Rep. of Korea

[21] Appl. No.: 537,677

[22] PCT Filed: Mar. 28, 1994

[86] PCT No.: PCT/KR94/00026

§ 371 Date: Jan. 18, 1996

§ 102(e) Date: Jan. 18, 1996

[87] PCT Pub. No.: WO94/24756

PCT Pub. Date: Oct. 27, 1994

[30] Foreign Application Priority Data

Apr. 21, 1993 [KR] Rep. of Korea ............ 1993-6753
Mar. 11, 1994 [KR] Rep. of Korea ............ 1994-4938
Mar. 16, 1994 [KR] Rep. of Korea ............ 1994-5258

[51] Int. Cl.$^6$ ........................................... H02K 4/00
[52] U.S. Cl. ............... 307/125; 307/116; 340/825.72; 340/825.57; 342/53; 367/197
[58] Field of Search ..................... 307/125, 116, 307/112; 340/825.69, 825.72, 825.57; 323/318; 327/379, 384; 342/53; 367/197

[56] References Cited

U.S. PATENT DOCUMENTS

| | | | |
|---|---|---|---|
| 4,430,576 | 2/1984 | Fowler | 307/38 |
| 4,780,621 | 10/1988 | Bartleucci et al. | 307/11 |
| 5,146,153 | 9/1992 | Luchaco et al. | 323/324 |
| 5,175,441 | 12/1992 | Den Hollander | 307/43 |
| 5,391,950 | 2/1995 | Krawczak | 327/384 |
| 5,462,225 | 10/1995 | Massara et al. | 236/47 |

Primary Examiner—William M. Shoop, Jr.
Assistant Examiner—Albert W. Paladini
Attorney, Agent, or Firm—Dilworth & Barrese

[57] ABSTRACT

The present invention relates to a manual and remote control switching system in which users can optionally turn on/off any load among a plurality of loads in different places. The switching system switches a power source being supplied to the plurality of loads by manipulating either a manual switch or a remote control switch, thereby controlling the power source supplied to the loads. The loads may be set up in a plurality of chambers blocked off from each other, with one remote controller in each chamber. The switching system includes a preventive device which prevents the control of loads in other chambers. Accordingly, the present invention provides a switching system which can easily control loads installed in a plurality of chambers blocked off from each other.

19 Claims, 8 Drawing Sheets

SWITCHING SYSTEM

TECHNICAL FIELD

The present invention relates to a manual and remote control switching system in which users can optionally turn on/off any load among a plurality of loads in each of different places, and more particularly relates to a switching system which switches a power source being supplied to loads by manipulating either a manual switch or a remote control switch, controls the power source supply to loads, which are set up in a plurality of chambers blocked off from each other, in each of chambers, displays an ON/OFF state and operation possibility of each load, and controls, if necessary, optionally the power source supply to loads.

BACKGROUND ART

Generally, there has been used a manual switch or a remote control switch in switching of a power source. A conventional switch has a drawback that users always operate the manual switches at their original places and carry with a remote controller.

DISCLOSURE OF THE INVENTION

Therefore, to solve the above problem in the conventional device, it is an object of the present invention to provide a switching system which switches optionally a power source of loads set up in the other chamber in respective chambers blocked off from each other as well as performs a switching operation by handling one of a manual switch and a remote control switch.

Another object of the present invention is to provide a switching system which can receive and transmit various control signals, in which a control part and a load part are connected with one signal transmission line.

To accomplish the above objects of the present invention, there is provided a switching system for controlling a power source being supplied to loads, the system comprising:

switching means for switching the power source; a remote controller for generating an infrared ray signal to control the switching means; receiving means for converting the infrared ray signal supplied from the remote controller into an electric signal; manual switches connected between output terminals of the receiving means and a power supplier; and control signal generating means for controlling the switching means according to the electric signal of the receiving means or an input voltage from the manual switches.

In addition, there is provided a switching system which includes at least two or more loads and switches a power source to be supplied to the loads, the system comprising:

switching means, coupled between each of loads and the power source, for switching the power source being supplied to the loads; two or more remote controllers for generating an infrared ray signal to control turning-ON/OFF of the switching means; two or more receiving means for converting the infrared ray signal supplied from the remote controllers into an electric signal; manual switches, connected between output terminals of the receiving means and a power supplier, for providing control signals to respectively control the loads; signal combining means for supplying signals to control the same load among the electric signal from the receiving means or voltages supplied from the manual switches, to control signal generating means; and control signal generating means for controlling the switching means according to signals supplied from the signal combining means.

Further, there is provided a switching system for switching a power source to be supplied to a plurality of loads, the system comprising:

first switching means, coupled to each of loads, for switching the power source being supplied to respective loads; remote controllers for generating an infrared ray signal to control the switching means; first receiving means for converting the infrared ray signal supplied from the remote controllers into an electric signal; manual switches connected between output terminals of the receiving means and a power supplier; signal transmission means for coding and transmitting the electric signal provided from any one of the receiving means and the manual switches to second receiving means; second receiving means for decoding signals supplied from the signal transmission means, and controlling the first switching means.

BEST MODE FOR CARRYING OUT THE INVENTION

The preferred embodiment of the present invention will be described below with reference to the accompanying drawings.

Figure 1:
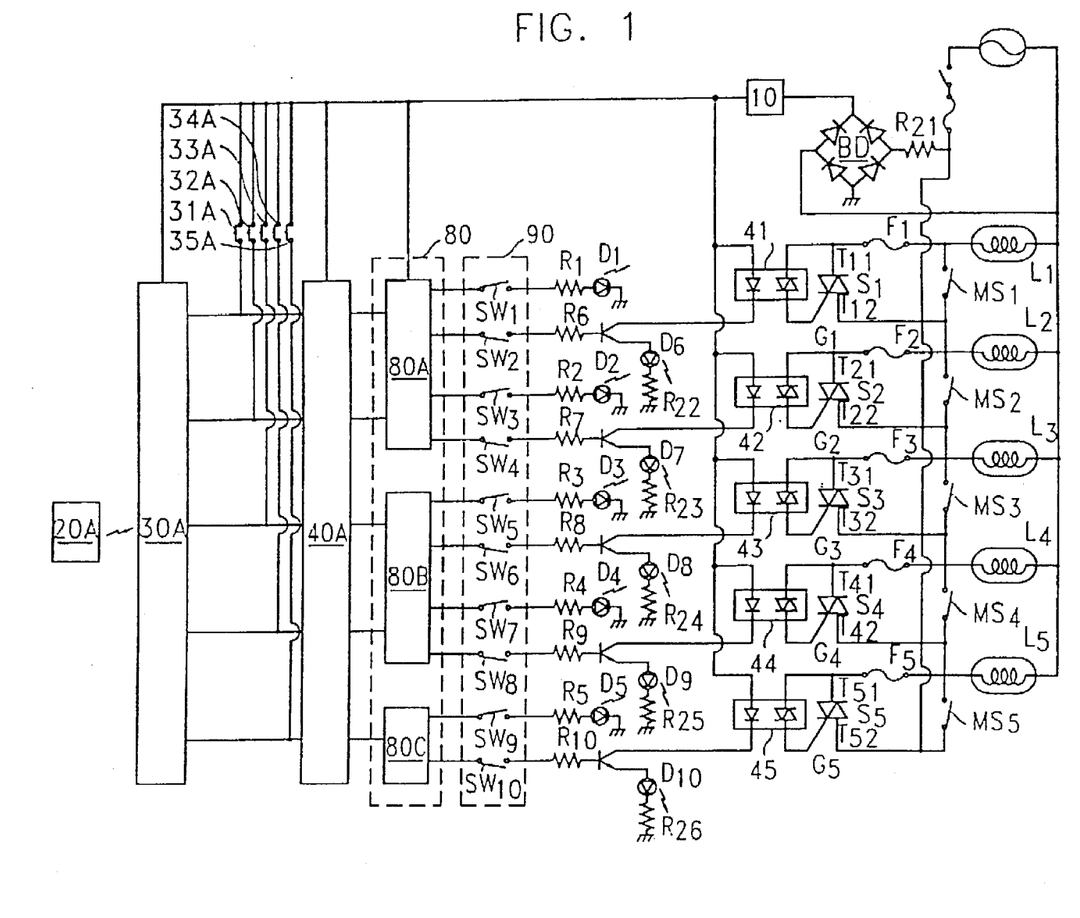
FIG. 1 is a circuit diagram of a switching system in accordance with one preferred embodiment of the present invention.

FIG. 1 illustrates a switching system in accordance with one preferred embodiment of the present invention. A first load $L_1$ is connected to a power source through a first triac $S_1$ of switching means. Also, second to fifth loads $L_2$~$L_5$ are respectively arranged in parallel through second to fifth triacs $S_2$~$S_5$. The alternating current power source is connected to a full-wave rectifier circuit BD that converts alternating current into direct current. A voltage stabilizer 10 coupled to an output terminal of the full-wave rectifier circuit BD provides a constant voltage to each component of switching circuit.

On the other hand, the switching system of the invention includes a remote controller 20A which generates an infrared ray signal, using for optionally switching each load, to a signal receiver 30A. The remote controller 20A can employ an integrated circuit such as TC9148P. The signal receiver 30A receives the infrared ray signal supplied from the remote control 20A and converts it to an electric signal. The receiver 30A can employ an integrated circuit such as TC9149P or TC9150P. Each of output terminals of the receiver 30A is connected to each of inputs of a chattering preventer 40A. The chattering preventer 40A can employ an integrated circuit such as MC14490P. First to fifth push button switches 31A~35A, which are connected between five output terminals of the receiver 30A and first to fifth input terminals of the chattering preventer 40A, are coupled to an output terminal of the voltage stabilizer 10.

The output terminals of the chattering preventer 40A are separately connected to input terminals of first to third control signal generators 80A, 80B and 80C for controlling triacs $S_1$~$S_5$ of switching means respectively. Each of the control signal generators 80A, 80B and 80C can employ an integrated circuit of 4027. Each of the control signal generators 80A, 80B and 80C outputs a plurality of a pair of binary signals. A first signal of each pair of binary signals drives a first Light emission diode (one of $D_1$~$D_5$) in order to display an OFF state of corresponding load, and a second signal turns the triacs $S_1$~$S_5$ on via photo-couplers 41~45.

A plurality of switches $SW_1$~$SW_{10}$ indicated by reference numeral 90 show a DIP switch, and SW2, SW4, SW6, SW8 and SW10 cut cuts off a circuit of unused loads.

Through the DIP switch 90 second green LED lamps $D_6$~$D_{10}$ emit light when the circuit of each of loads is switched "ON". First red LED lamps $D_1$~$D_5$ emit light when the circuit of each of loads is switched "OFF". All of green and red LED lamps $D_1$~$D_{10}$ do not emit light when each of loads is not used. Thereby, the ON/OFF state of a plurality of respective loads and use possibility of loads are easily recognized, and further power-saving efficiency can be obtained by selectively using only necessary loads. Reference codes $F_2$~$F_5$ represent fuses, which are installed in every loads and prevent damages due to the overload. $MS_1$~$MS_5$ represent conventional manual switches for controlling manually each of loads, respectively.

The operation of the switching system in accordance with one preferred embodiment of the present invention will be described below. First, if the remote controller 20A generates the infrared ray signal for suppling a power source to the first load, the signal receiver 30A receives the infrared ray signal supplied from the remote controller 20A, converts it to an electric signal and outputs the converted signal through a first output terminal. The output signal drives the first photo-coupler 41 via the first control signal generator 80A and DIP switch 90. Accordingly, since the first triac $S_1$ is turned on, the power source is supplied to the first load $L_1$. Here, the chattering preventer 40A has a function of preventing the maloperation of an input signal.

Otherwise, manual switches can be manipulated for suppling or cutting-off an electric power to loads. For instance, in the case that a second push button switch 32A is in an "ON" state, a predetermined voltage of the power source is supplied to a second input terminal of the first control signal generator 80A via the chattering preventer 40A, and a second photo-coupler 42 is turned on. Accordingly, since the second triac $S_2$ is turned on, a power source is supplied to a second load $L_2$.

The above description relates to an operation of controlling respectively two loads being in parallel, but the same control of switching operation is performed for a plurality of loads shown in the drawing. In additon, six or more loads may be applied without departing from the technical scope of the present invention.

Figure 2A:
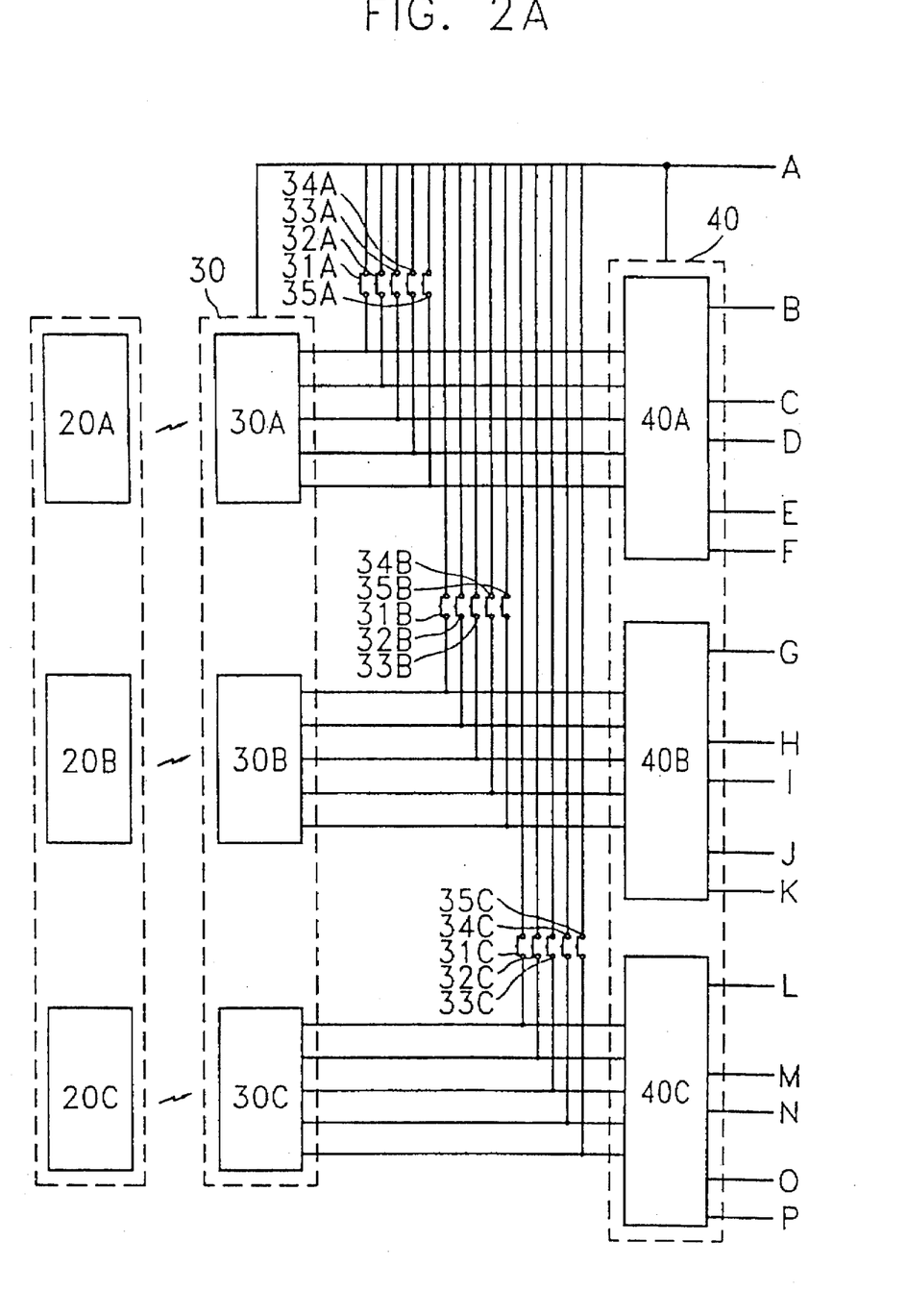
FIGS. 2A to 2C are circuit diagrams of a switching system in accordance with other preferred embodiment of the present invention.
Figure 2B:
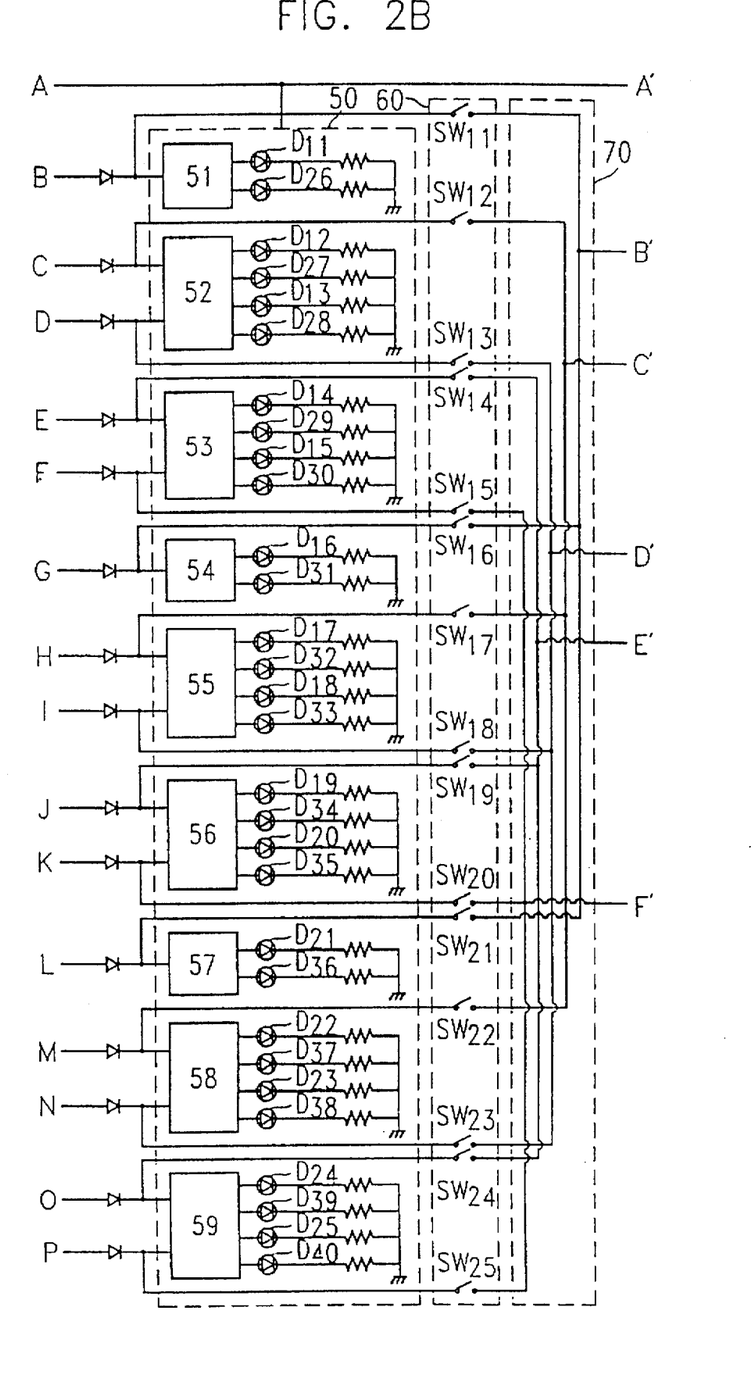
Figure 2C:
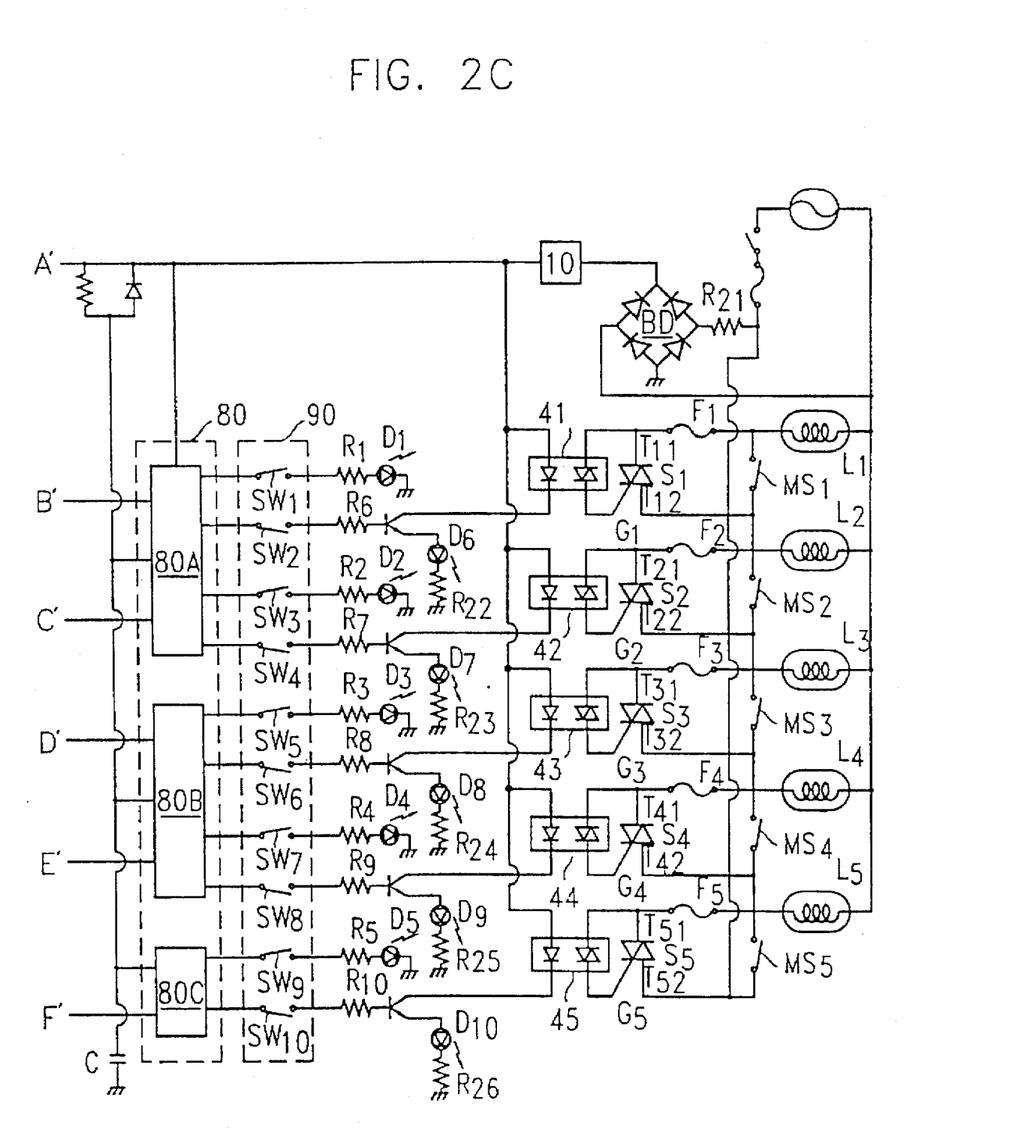

FIGS. 2A to 2C illustrate circuit diagrams of a switching system in accordance with another embodiment of the present invention.

The components which perform the same functions as in FIG. 1 are designated with the same reference numerals, and the desciption of the same components is omitted. The switching system of this preferred embodiment, in the case that a plurality of loads are set up in at least two or more cut-off chambers, has a function of controlling each of loads in different chambers from each other. The preferred embodiment shows the construction for respectively controlling five loads in three chambers cut off from each other. The embodiment comprises three remote controllers 20A, 20B and 20C so that the same remote controller as the preferred embodiment of FIG. 1 is separately arranged in the three chambers; signal receivers 30A, 30B and 30C for convening corresponding signals of each of remote controllers 20A, 20B and 20C into electric signals; and each of switches 31A~35A, 31B~35B and 31C~35C as many as five loads, placed between the output terminals of the receivers 30A, 30B and 30C and a power supplier.

Each signal receiver 30A or 30B or 30C outputs signals via chattering preventer 40A or 40B or 40C. That is, each of the receivers 30A, 30B and 30C outputs the corresponding signals via the chattering preventers 40A, 40B and 40C. respectively. The signal combining means 70 combines signals generated by different sets for controlling the same loads, and supplies the combined signal to the control signal generator 80. Condenser C which is in front of the control signal generator 80 is placed between a voltage source and ground. The condenser C is for the purpose of maintaining the loads to be OFF, even if the power source is supplied after about five seconds lapse of a power suspension. Since the construction of the control signal generator 80 is the same as the embodiment of FIG. 1, the specific description is omitted.

A display unit 50, which is between the chattering preventer 40A and the signal combining means 70, displays an operation state of loads installed in different chambers. The display unit 50 comprises fourth to twelfth control signal generators 51~59 for generating a high signal to one of two output terminals according to the signal level when each of signals from the chattering preventer 40A which outputs one among pairs of binary signals is input, and a plurality of LED lamps $D_{11}$~$D_{40}$ for performing an operation when the outputs of fourth to twelfth control signal generators 51~59 are in the "high" state. The DIP switch 60 is composed of a plurality of switches $SW_{11}$~$SW_{25}$ which are between the chattering preventer 40A and the signal combining means 70.

The operation of the embodiment of FIG. 2 will be more specifically described. Since the operation of signals supplied to the control signal generator 80 via the first chattering preventer 40A is the same as the embodiment of FIG. 1, the specific description is not necessary. A circuit composed until before the signal combining means 70, which includes first remote controller 20A, first receiver 30A and first push button switches 31A~35A, is disposed in a first chamber. A circuit composed until before the signal combining means 70, which includes second remote controller 20B, second reciver 30B and second push button switches 31B~35B, is disposed in a second chamber. A circuit composed until before the signal combining means 70, which includes third remote controller 20C, third reciver 30C and third push button switches 31C~35C, is disposed in a third chamber. An example that the first load $L_1$ of the first chamber is controlled by the second remote controller 20B installed in the second chamber will be described. If a turning-on signal of the first load $L_1$ with the second remote controller 20B is output, the turning-on signal is supplied to the first control signal generator 80A via second chattering preventer 40B. The first control generator 80A makes to light LED lamp $D_6$ up, and simultaneously to give the light to the first load $L_1$ by turning triac 41 "ON". Here, the first turning-on signal via second chattering preventer 40B is simultaneously provided to fourth control signal generator 51, seventh control signal generator 54 and tenth control signal generator 57, and thereby lighting LED lamp $D_{11}$, LED lamp $D_{16}$ and LED lamp $D_{21}$. Accordingly, it can be recognized in each of chambers that the first load $L_1$ is "ON".

Even though only one embodiment is illustrated, a control operation in respective chambers in respect to each of loads will be easily understood. If the control of the first load $L_1$ which is installed in the first chamber, is not intended to be performed in the third chamber, the first load $L_1$ is not controlled in the third chamber by switching a switch $SW_{21}$ among DIP switch 60 "OFF". Of course, those of ordinary skill in the art can easily understand an application of this operating principle.

Figure 3A:
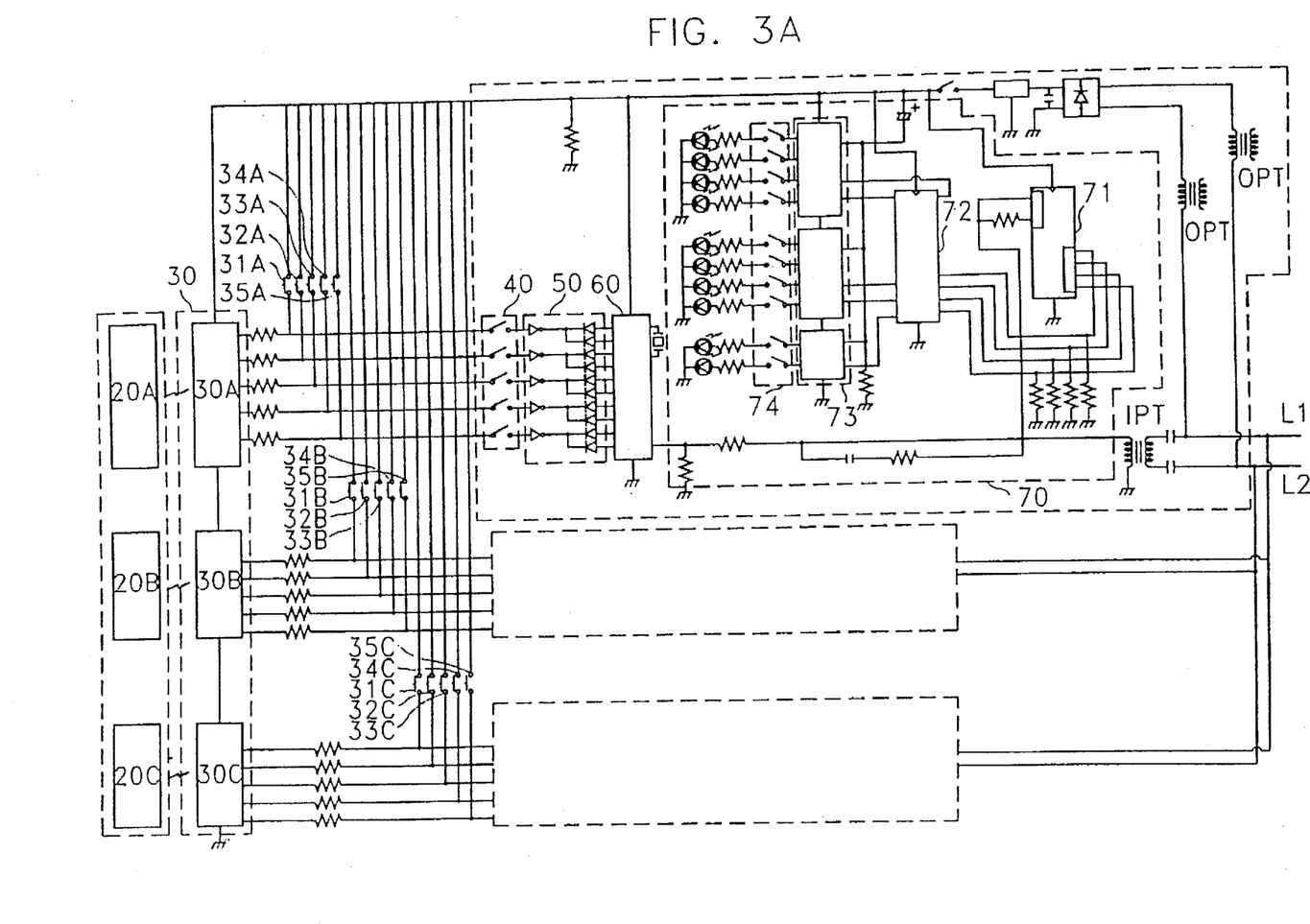
FIGS. 3A and 3B are circuit diagrams of a switching system in accordance with another preferred embodiment of the present invention.
Figure 3B:
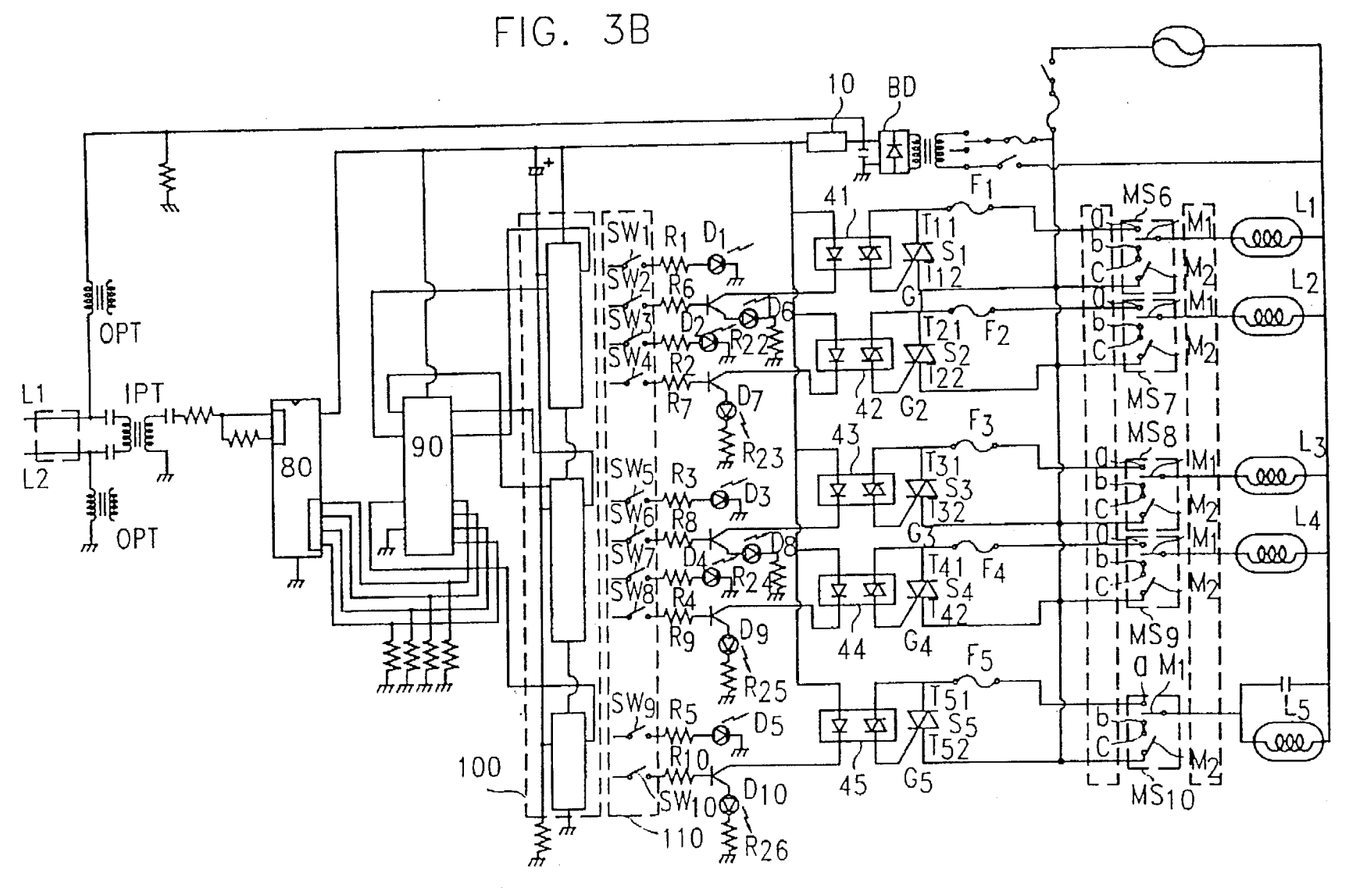

FIGS. 3 illustrate circuit diagrams of a switching system in accordance with another preferred embodiment of the present invention. The switching system of the present invention is mainly composed of a control part and a load pan. The control part and the load part are connected by a pair of conductors L1 and L2. The switching system of this preferred embodiment, in the case that a plurality of loads are set up in at least two or more cut-off chambers, has a function of controlling each of loads in different chambers from each other. The preferred embodiment shows the construction for respectively controlling five loads in three chambers cut off from each other. The embodiment comprises three remote controllers 20A, 20B and 20C so that the same remote controller as the preferred embodiment of FIG. 1 is separately arranged in the three chambers. The remote controllers can employ an integrated circuit such as TC9148P. The embodiment comprises signal receivers 30A, 30B and 30C for converting corresponding signals of each of the remote controllers 20A, 20B and 20C into electric signals, and each of switches 31A~35A, 31B~35B and 31C~35C as many as five loads, placed between the output terminals of the receivers 30A, 30B and 30C and a power supplier. The signal receivers 30A, 30B and 30C can employ an integrated circuit such as TC9149P or TC9150P.

Each of output terminals of the signal receivers 30A, 30B and 30C is connected to a signal transmission unit 60 via DIP switch 40 and matrix unit 50. An output of the signal transmission unit 60 is provided to the load part as FIG. 3B through a pair of conductors L1 and L2. The output of the signal transmission unit 60 is also supplied to a LED display unit 70. Here, the matrix unit 50 and the signal transmission unit 60 can employ an integrated circuits such as HD4049 and KS5808, respectively.

The LED display unit 70 is composed of a signal decoder 71, matrix unit 72, LED driving signal generator 73 and LED display elements. It is preferred that a DIP switch 74 of manual control is placed between LED display elements and LED driving signal generator 73. Here, the signal decoder 71, matrix unit 72, LED driving signal generator 73 can employ integrated circuits such as KT3170, CD4028 and HD4027, respectively. Here, only the output terminal of the first receiver 30A is described, but output terminals of the second and third receivers 30B and 30C also have the same composition from the DIP switch 40 to a pair of conductors L1 and L2.

The load part comprises receiving means 80 for decoding transmission signals from the conductors L1 and L2. The receiving means 80 is connected with a matrix unit 90, and output terminals of the matrix unit 90 are connected with a control signal generator 100. The receiving means 80 and matrix unit 90 can employ integrated circuits such as KT3170 and CD4028, respectively. The control signal generator 100 can employ an integrated circuit such as HD4027.

On the other hand, alternating current power source is connected to a first load $L_1$ through a first triac $S_1$ of switching means. Also, second to fifth loads $L_2$~$L_5$ are respectively arranged in parallel through second to fifth triacs $S_2$~$S_5$. Switches $MS_6$~$MS_{10}$ are located between each of triacs of electronic switching means and loads. The switches have a function of controlling loads electronically and manually. When a first contactor $M_1$ contacts with a first node (a), the load is electronically controlled. When the first contactor $M_1$ contacts with a second node (b), the load is manually controlled. In a state that the first contactor $M_1$ contacts with the second node (b), that is, in a manual control state, the second contactor $M_2$ plays a role of turning on/off loads. The alternating current power source is connected to a full-wave rectifier circuit BD that converts alternating current into direct current. A voltage stabilizer 10 coupled to an output terminal of the full-wave rsectifier circuit BD provides a constant voltage to the system of the present invention.

On the other hand, each of control signal generators 100A, 100B and 100C outputs a plurality of a pair of binary signals. A first signal of each pair of binary signals drives a first light emission diode (one of $D_1$~$D_5$) in order to display an OFF state of corresponding load, and a second signal turns the triacs $S_1$~$S_5$ on via photo-couplers 41~45.

A plurality of switches $SW_1$~$SW_{10}$ indicated by reference numeral 110 show a DIP switch, and cuts off a circuit of unused loads.

Through the DIP switch 110 second green LED lamps $D_6$~$D_{10}$ emit light when the switching circuit of each of loads is switched "ON". First red LED lamps $D_1$~$D_5$ emit light when the circuit of each of loads is switched "OFF". All of green and red LED lamps $D_1$~$D_{10}$ do not emit light when each of loads is not used. Thereby, the ON/OFF state of a plurality of respective loads and use possibility of loads are easily recognized, and further power-saving efficiency can be obtained by selectively using only necessary loads. Reference codes $F_1$~$F_5$ represent fuses, which are installed in every loads and prevent damages due to the overload.

The operation of the switching system of the embodiment will be described below. First, the remote controller 20A generates the infrared ray signal for suppling a power source to the first load. The receiver 30A receives the infrared ray signal, converts it to an electric signal and outputs the converted signal through a first output terminal. The signal is matched through matrix unit 50, and the matched signal is coded in a signal transmission unit 60 and provided to the load part through a pair of conductors L1 and L2. The coded signal from the signal transmission unit 60 is also supplied to the LED display unit 70 in the control part. The signal decoder 71 in the display unit 70 decodes the coded signal, and outputs a decoded signal to the LED driving signal generator 73 via matrix unit 72. Accordingly, since the LED driving signal generator 73 drives a corresponding LED, an operation state of loads can be recognized.

Through conductors L1 and L2, the coded signal input from the signal transmission unit 60 is provided to receiving means 80. The receiving means 80 decodes the coded signal and outputs the decoded signal to the control signal generator 100 via matrix unit 90. The control signal generator 100 drives a first photo-coupler 41, and the power source is provided to the first load $L_1$ by turning-on of the first triac $S_1$.

A control part controlled by the first remote controller 20A, first reciver 30A and first push button switches 31A~35A is disposed in a first chamber. A control part controlled by the second remote controller 20B, second reciver 30B and second push button switches 31B~35B is disposed in a second chamber. A control part controlled by the third remote controller 20C, third reciver 30C and third push button switches 31C~35C is disposed in a third chamber. An example that the first load $L_1$ of the first chamber is controlled by the second remote controller 20B installed in the second chamber will be fully understood by the above description.

Figure 4A:
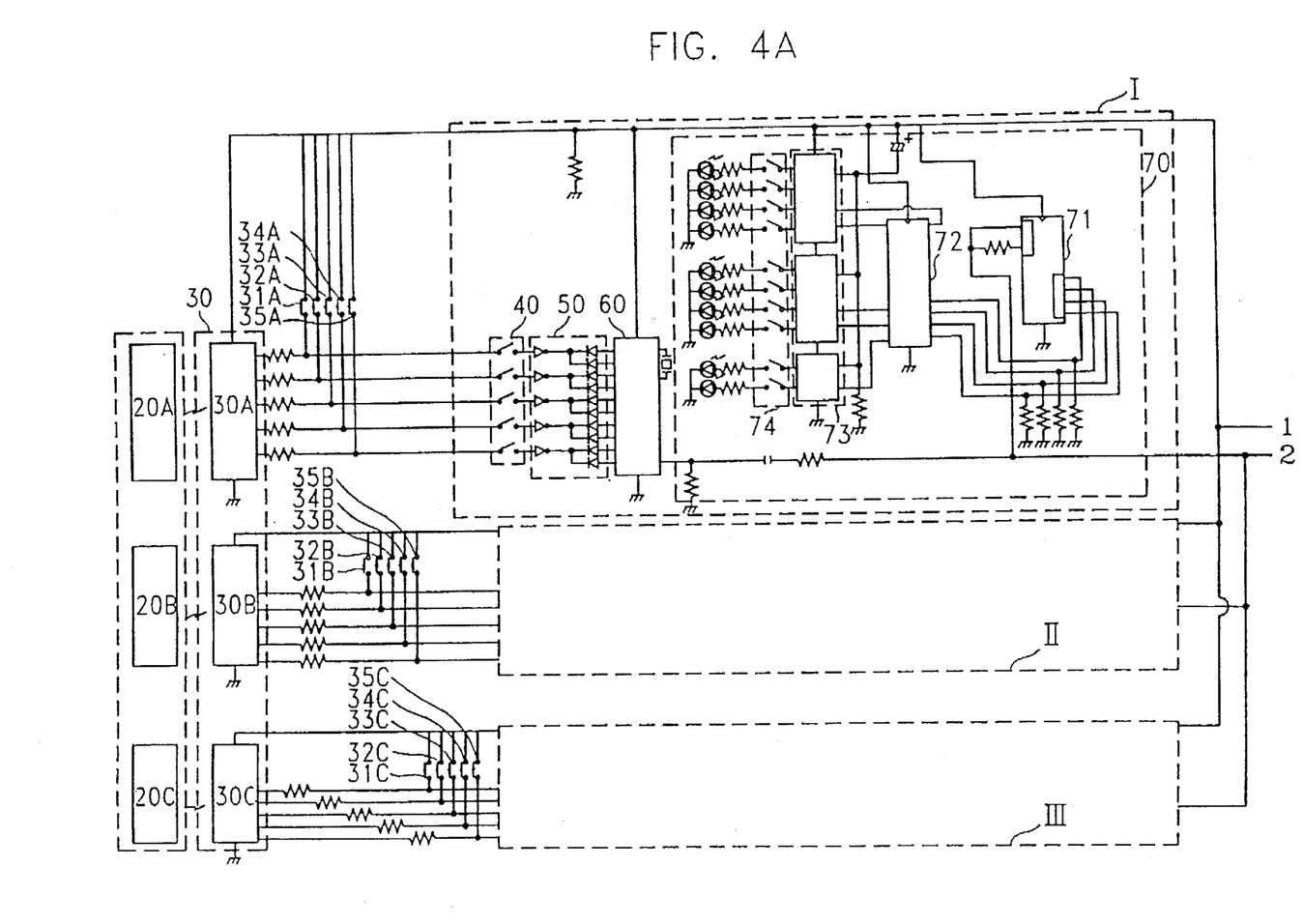
FIGS. 4A and 4B are circuit diagrams showing a modified preferred embodiment of FIGS. 3.
Figure 4B:
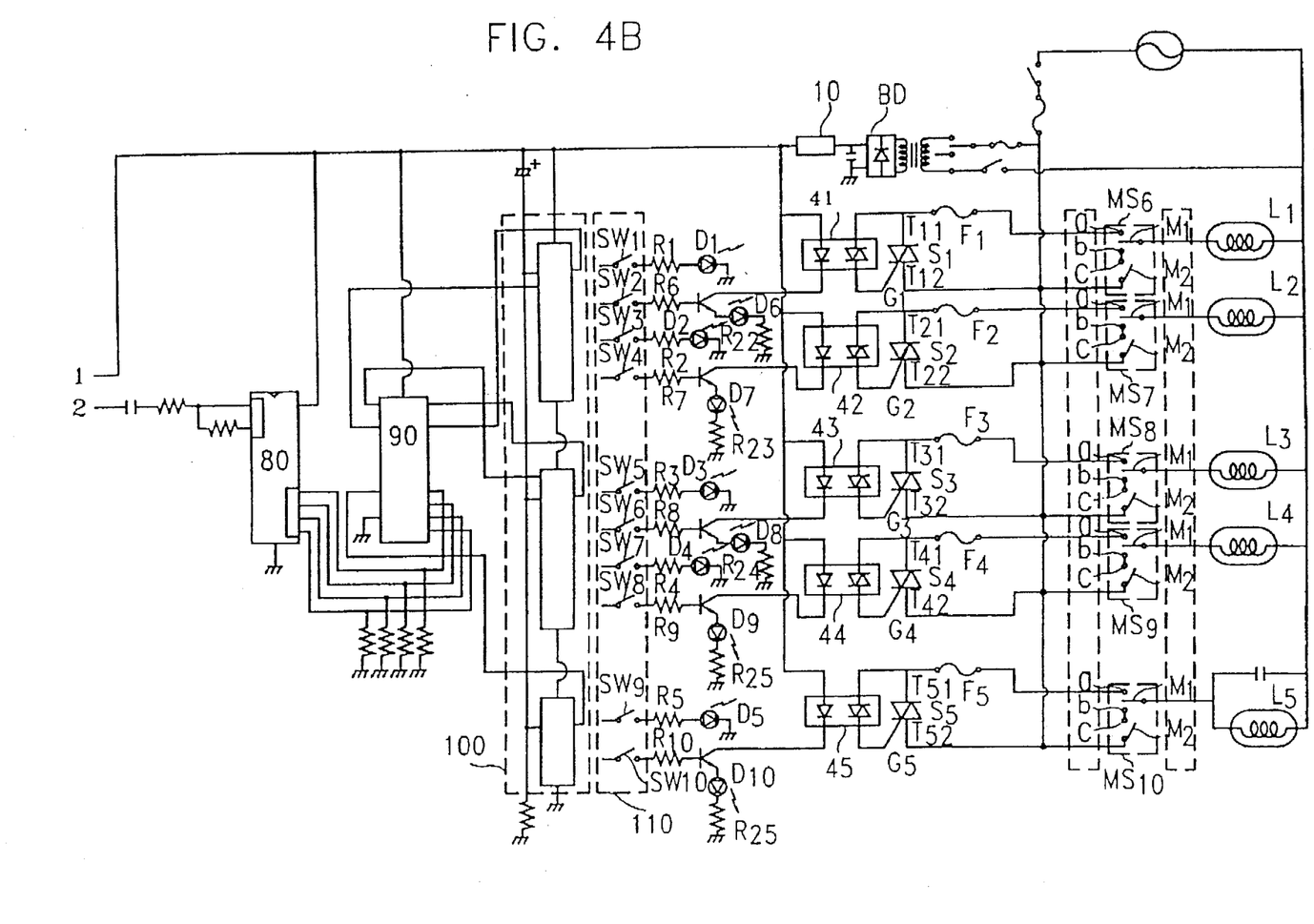

FIGS. 4A and 4B illustrate circuit diagrams showing a modified embodiment of FIG. 3. The construction of this embodiment omits transformers OPT and IPT for transmitting power source and signals from the embodiment of FIG. 3, but the other components equal those of FIG. 3. Therefore, the same components choose the same reference numerals of FIG. 3. Those of ordinary skill in the art can fully understand the construction and operation of the embodiment without further description. In addition, each of second and third blocks II and III shown in dotted line is identical with the inside of a first block I, and therefore the description is omitted.

In preferred embodiments of FIGS. 3 and 4, integrated circuits of the signal transmission means 50 and 60, receiving means 80, 90 and 100, and LED display units 71, 72 and 73 can be composed of one single chip, respectively. Also, a signal line between the control part and load part of the present invention can be connected with home-autocontroller generally well-known.

INDUSTRIAL APPLICABILITY

As described above, a switching system in accordance with the present invention performs a mutual switching operation by both a manual switch and a remote controller, displays states of each load and stops the operation of an unused switching circuit. In addition, the switching system can optionally control loads set up in a plurality of chambers blocked off from each other, in each of chambers, and display the control state of loads to each of chambers. The switching system has good effects that a preventive device which prevents the control of a predetermined load, if necessary, may be installed in any chamber, and provide power-saving efficiency and convenience of user's switching operation.

What is claimed is:

1. A switching system for controlling a power source being supplied to loads, the system comprising:

switching means, coupled between each of the loads and the power source, for switching the power source being supplied to the loads;

two or more remote controllers for generating an infrared ray signal to control turning-ON/OFF of said switching means;

two or more receiving means for converting the infrared ray signal supplied from said remote controller into an electric signal;

manual switches, connected between output terminals of said receiving means and the power source, for providing control signals to respectively control said loads;

a plurality of connections for connecting the electric signal from said receiving means or control signals from said manual switches, to control signal generating means for controlling said switching means according to signals inputted from said plurality of connections.

2. The switching system as claimed in claim 1, further comprising a chattering preventer, placed before said control signal generating means, for preventing a chattering of signals input from said manual switches and said receiving means.

3. The switching system as claimed in claim 1, further comprising a DIP switch connected to output terminals of said control signal generating means.

4. The switching system as claimed in claim 3, further comprising LED lamps, coupled to output terminals of said DIP switch, for displaying an ON/OFF state of loads.

5. A switching system for including at least two or more loads and switching a power source to be supplied to said loads, the system comprising:

switching means, coupled between each of said loads and said power source, for switching the power source being supplied to the loads;

two or more remote controllers for generating an infrared ray signal to control turning-ON/OFF of said switching means;

two or more receiving means for converting the infrared ray signal supplied from said remote controller into an electric signal;

manual, switches, connected between output terminals of said receiving means and the power source for providing control signals to respectively control said loads;

signal combining means for suppling signals from the electric signal from said receiving means or control signals from said manual switches, to control signal generating means for controlling said switching means according to signals inputted from said signal combining means.

6. The switching system as claimed in claim 5, further comprising a chattering preventer, placed between said receiving means and said signal combining means, for preventing a chattering of signals input from said manual switches and said receiving means.

7. The switching system as claimed in claim 6, further comprising at least two or more display units, connected to output terminals of said chattering preventer, for displaying an ON/OFF state of each of said loads.

8. The switching system as claimed in claim 5, further comprising a DIP switch, connected to input terminals of said signal combining means, for including a plurality of first switches to turn on/off signals input to said signal combining means.

9. The switching system as claimed in claim 5, further comprising a plurality of second switches, placed between each load and a power supplier, for manually controlling a supplied voltage.

10. The switching system as claimed in claim 5, wherein said control signal generating means comprises a reset unit which maintains loads to be OFF, even if the power source is supplied after about five seconds lapse of a power suspension.

11. A switching system for switching a power source to be supplied to a plurality of loads, the system comprising:

first switching means, coupled to each of loads, for switching the power source being supplied to respective loads;

remote controllers for generating an infrared ray signal to control said switching means;

first receiving means for converting the infrared ray signal supplied from said remote controller into an electric signal;

manual switches connected between output terminals of said receiving means and the power source;

signal transmission means for coding and transmitting the electric signal provided from any one of said receiving means and said manual switches to second receiving means; and second receiving means for decoding signals supplied from said signal transmission means, and controlling said first switching means.

12. The switching system as claimed in claim 11, further comprising at least two or more display units, connected to output terminals of said signal transmission means, for displaying an ON/OFF state of each of said loads.

13. The switching system as claimed in claim 11, further comprising a plurality of second switches, connected between each load and switching means, for selecting one of an electric and manual switching operations.

14. The switching system as claimed in claim 13, wherein a plurality of said second switches comprise a third switch for turning ON/OFF corresponding loads when the manual switching operation is selected.

15. The switching system as claimed in claim 11, wherein said remote controller, receiving means and signal transmission means are composed of a plurality of sets.

16. The switching system as claimed in claim 15, wherein signals output from a plurality of said sets are input to a pair of signal transmission lines.

17. The switching system as claimed in claim 11, wherein integrated circuits of said signal transmission means, said receiving means and said display units are respectively composed of one single chip.

18. The switching system as claimed in claim 2, further comprising a DIP switch connected to output terminals of said control signal generating means.

19. The switching system as claimed in claim 12, wherein integrated circuits of said signal transmission means, said receiving means and said display units are respectively composed of one single chip.

* * * * *

UNITED STATES PATENT AND TRADEMARK OFFICE
CERTIFICATE OF CORRECTION

PATENT NO. : 5,717,258
DATED : February 10, 1998
INVENTOR(S) : Hyung Sik PARK

It is certified that error appears in the above-identified patent and that said Letters Patent is hereby corrected as shown below:

On the title page item [73], delete:

"[73] Assignee: Medison Co., Ltd., Kangwon-do, Republic of Korea".

Signed and Sealed this

Fourteenth Day of September, 1999

Attest:

Q. TODD DICKINSON

*Attesting Officer*                *Acting Commissioner of Patents and Trademarks*